(12) United States Patent
Palinkas

(10) Patent No.: US 6,419,214 B2
(45) Date of Patent: *Jul. 16, 2002

(54) NON-LINEAR SPRING RATE SWAY BAR BUSHING

(75) Inventor: Richard L. Palinkas, Northfield, CT (US)

(73) Assignee: Uniroyal Chemical Company, Inc., Middlebury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,589

(22) Filed: Sep. 27, 1999

(51) Int. Cl.⁷ ................................................ F16F 7/00
(52) U.S. Cl. ..................... 267/141; 267/189; 267/141.2; 267/293; 248/635
(58) Field of Search ................................. 267/273, 188, 267/189, 154, 276, 279, 292, 293, 219, 141.2, 141, 141.1; 248/608, 609, 635, 638; 180/300

(56) References Cited

U.S. PATENT DOCUMENTS

| | | | | |
|---|---|---|---|---|
| 3,311,364 A | * | 3/1967 | De Castelet | 267/276 |
| 4,033,605 A | * | 7/1977 | Smith et al. | 267/57 |
| 4,610,420 A | * | 9/1986 | Fukushima et al. | 180/300 |
| 4,685,531 A | * | 8/1987 | Kopich | 267/292 |
| 4,872,651 A | * | 10/1989 | Thorn | 267/293 |
| 5,154,403 A | * | 10/1992 | Sato | 267/141.2 |
| 5,295,670 A | * | 3/1994 | Tsukamoto et al. | 267/140.5 |
| 5,518,819 A | * | 5/1996 | Shibahara et al. | 428/465 |
| 5,884,892 A | * | 3/1999 | Gassen et al. | 267/141.1 |
| 5,984,283 A | * | 11/1999 | Tsuiki et al. | 267/33 |
| 5,997,038 A | * | 12/1999 | Dostert et al. | 280/781 |

* cited by examiner

Primary Examiner—Paul N. Dickson
Assistant Examiner—Mariano Sy
(74) Attorney, Agent, or Firm—McCormick, Paulding & Huber LLP

(57) ABSTRACT

A sway bar bushing made from elastomeric material of substantially uniform thickness having a generally cylindrical inner part and a generally cylindrical outer part coaxially surrounding said inner part. A plurality of equiangularly spaced apart and radially disposed spokes provide integral connection between the inner and outer parts and extend radially therebetween. The inner and outer parts are of substantially identical length and connected along the entire lengths thereof by the spokes. The inner part defines a bore for complementing an associated portion of a sway bar received therein.

12 Claims, 1 Drawing Sheet

NON-LINEAR SPRING RATE SWAY BAR BUSHING

BACKGROUND OF THE INVENTION

This invention relates in general to article support members and deals more particularly with an improved elastomeric sway bar bushing for supporting a sway bar and controlling motion of the bar in response to applied force.

Heretofore elastomeric bushings of various designs have been employed to support a sway bar and control motion of the bar. Where a vehicle or apparatus in which a sway bar is employed is subjected to relatively light impact loads linear sway bar displacement in response to impact may be acceptable. However, where large impact loads are encountered, as, for example, in a sway bar for a skip car for receiving and transporting heavy loads of rock or ore in a quarry. A bushing which provides a greater degree of energy absorption in response to large impact loads is required.

Accordingly, it is the general aim of the present invention to provide an elastomeric sway bar bushing which has a non-linear spring rate which enables disproportionately large sway bar displacements for improved energy absorption of large impact loads.

SUMMARY OF THE INVENTION

In accordance with the present invention a non-linear spring rate sway bar bushing comprises a unitary bushing member formed from resilient elastomeric material and having an axially elongated tubular inner portion defining a bore extending axially therethrough for receiving and containing a portion of a sway bar therein. An elongated outer portion of the bushing member is supported in radially outwardly spaced relation to the inner portion by radially extending ribs angularly spaced about the axis of the bore and integrally connected to and extending between the inner portion and the outer portion and maintaining the inner portion in radially inwardly spaced relation to the outer portion.

DETAILED DESCRIPTION OF PREFERRED EMBODIMENT

Figure 1:
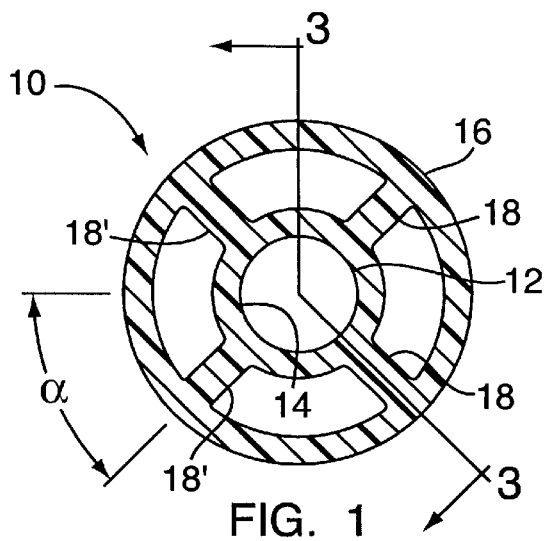
FIG. 1 is a transverse sectional view through a non-linear spring weight sway bar bunching embodying the present invention.
Figure 2:
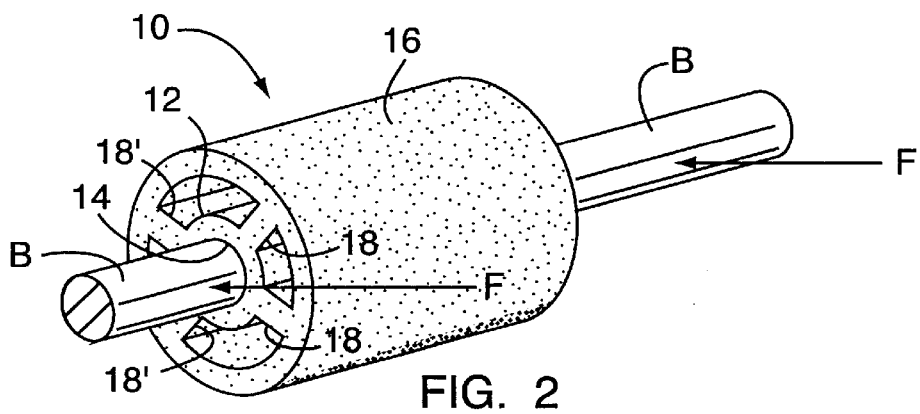
FIG. 2 is a perspective view of the bushing shown in FIG. 1 illustrating an application thereof.
Figure 3:
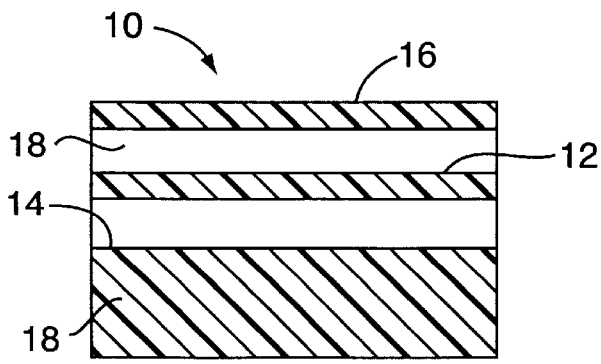
FIG. 3 is a sectional view taken generally along the line 3—3 of FIG. 1.

Turning now to the drawing and referring first particularly to FIGS. 1 and 2, a non-linear spring rate sway bar bushing embodying the present invention is indicated generally by the reference numeral 10. The illustrated sway bar bushing 10 essentially comprises a unitary bushing member molded or otherwise formed from a resilient elastomeric material, such as a rubber compound, and includes an axially elongated tubular inner portion 12 which has a bore 14 extending axially through it for receiving and containing a portion of a sway bar therein. The bushing 10 further includes an elongated outer portion 16. A plurality of radially extending ribs 18, 18 angularly spaced about the axis of the bore 14 and integrally connected to and extending between the inner portion 12 and the outer portion 16 maintain the inner portion in radially inwardly spaced relation to the outer portion. Considering now the sway bar bushing in further detail, the illustrated bushing member 10 is preferably made from an elastomeric material of substantially uniform thickness. The inner and outer portions 12 and 16 are preferably generally cylindrical tubular portions maintained in coaxial alignment with each other by the ribs or spokes 18, 18 which are angularly spaced about the central axis of the bore 14. The bore is also generally cylindrical to receive and retain a complementary cylindrical portion of a sway bar, such as the bar shown in FIG. 2 and indicated generally by the letter B.

In accordance with presently preferred construction, the sway bar bushing 10 has four equiangularly spaced apart and radially extending ribs or spokes 18, 18.

Preferably, and as shown, the inner portion 12 and the outer portion 16 are of substantially identical axial length, the inner portion being wholly disposed within the outer portion of the bushing. The ribs 18, 18 are integrally connected to the inner and outer portions 12 and 16 along the entire lengths of the inner and outer portions.

A typical application of the bushing 10 is shown in FIG. 2. The outer part 16 is mounted in a fixed position relative to a part of an apparatus (not shown) to support and control movement of an associated portion of the sway bar B which is connected to another part of the aforementioned apparatus. As illustrated, the sway bar B is generally constrained within the apparatus to move in the direction indicated by the directional arrows F, F in response to an impact force acting upon the apparatus. The preferred geometry and mounting arrangement of the bushing 10 is such that sway bar movement occurs generally within a diametric plane of the cylindrical bushing which plane bisects the angles between the equiangularly spaced apart spokes at diametrically opposite sides of the sway bar bushing. In FIG. 2 the spokes at one side of the bushing are indicated at 18, 18, whereas the spokes at the diametrically opposite sides are indicated at 18', 18'.

Figure 4:
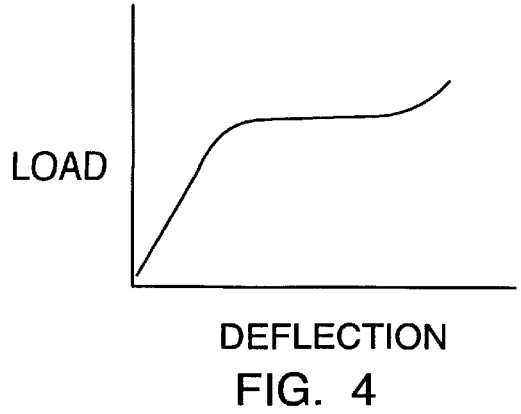
FIG. 4 is a load vs. deflection graft of the application shown in FIG. 2.

When the apparatus (not shown) is subjected to an impact force which causes the sway bar B to move in the direction of the arrows F, F in FIG. 2 the spokes 18', 18' will be subjected to compressive force whereas the spokes 18, 18 will be in tension. It should be apparent that the spokes will undergo a change in angular relationship relative to each other. This change in the angular relationship between the spokes causes a non-linear spring rate to develop within the bushing acting upon the sway bar B. The resulting deflection of the bar in response to an increasing impact load is graphically illustrated in the graph shown in FIG. 4.

What is claimed is:

1. A non-linear spring rate sway bar bushing comprising:
    a unitary bushing member formed from resilient elastomeric material and having an axially elongated tubular inner portion defining a bore extending axially through said tubular inner portion for receiving and fixedly engaging a portion of a sway bar therein;
    an axially elongated tubular outer portion coaxially surrounding said tubular inner portion; and
    at least four equiangularly spaced apart radially extending spokes integrally connected to and extending between said tubular outer portion and maintaining said tubular inner portion in radially inwardly spaced relation to said tubular outer portion, the tubular inner portion, the tubular outer portion and the spokes being generally the same thickness relative to each other, to thereby facilitate a change in the angular relationship between the spokes when subject to an impact force and cause a non-linear spring rate to develop in the sway bar bushing.

2. A non-linear spring rate sway bar bushing as set forth in claim 1 wherein said sway bar bushing has four spokes.

3. A non-linear spring rate sway bar bushing as set forth in claim 1 wherein said bore is adapted to complement said portion of said sway bar received and retained therein.

4. A non-linear spring rate sway bar bushing as set forth in claim 1 wherein said tubular inner portion and said tubular outer portion comprises cylindrical tubular portions.

5. A non-linear spring rate sway bar bushing as set forth in claim 4 wherein said elastomeric material has a substantially uniform thickness.

6. A non-linear spring rate sway bar bushing as set forth in claim 1 wherein said tubular inner portion has the same length as said tubular outer portion and is wholly disposed within said tubular outer portion.

7. A non-linear spring rate sway bar bushing as set forth in claim 6 wherein said radially extending spokes are integrally connected to said tubular inner portion and said tubular outer portion along the entire length of said tubular inner portion and said tubular outer portion.

8. A non-linear spring rate sway bar comprising: a unitary bushing member formed from elastomeric material of substantially uniform thickness, said bushing member having an axially elongated generally cylindrical tubular inner portion defining a coaxial bore having an inside diameter substantially equal to an outside diameter of a cylindrical portion of a sway bar adapted to be received and retained therein, said inside diameter of said tubular inner portion defining a peripheral surface engaged with said sway bar, said bushing member having an axially elongated generally cylindrical tubular outer portion equal in length to said inner portion, said inner portion being coaxially aligned with and wholly disposed within said outer portion, and four radially disposed and equiangularly spaced apart ribs integrally connected to and radially extending between said inner portion and said outer portion, along the entire length of said inner portion and said outer portion, and maintaining said inner portion in coaxial alignment with said outer portion, the tubular inner portion, the tubular outer portion and the ribs being generally the same thickness relative to each other, to thereby facilitate a change in the angular relationship between the spokes when subject to an impact force and cause a non-linear spring rate to develop in the sway bar.

9. A non-linear spring rate sway bar bushing comprising:
a unitary bushing member formed from resilient elastomeric material and including an axially elongated inner portion defining a bore extending axially therethrough for receiving and fixedly engaging a portion of a sway bar therein;
an elongated outer portion; and
at least four radially extending ribs equiangularly spaced about the axis of said bore and integrally connected to and extending between said inner portion and said outer portion and maintaining said inner portion in radially inwardly spaced relation to said outer portion, the inner portion, the outer portion and the ribs being generally the same thickness relative to each other, to thereby facilitate a change in the angular relationship between the ribs when subject to an impact force and cause a non-linear spring rate to develop in the sway bar bushing.

10. A non-linear spring rate sway bar bushing as set forth in claim 9 wherein said tubular portions are cylindrical and said ribs maintain said tubular portions in coaxial alignment with each other.

11. A non-linear spring rate sway bar bushing consisting essentially of:
a unitary bushing member formed from resilient elastomeric material having an axially elongated tubular inner portion defining a bore extending axially through said tubular inner portion for receiving and fixedly engaging a portion of a sway bar therein;
an axially elongated tubular outer portion coaxially surrounding said tubular inner portion; and
at least four equiangularly spaced ribs radially extending between said tubular inner portion and said tubular outer portion defining a void between said ribs wherein upon mounting said bushing to a sway bar, a diametric plane bisects angles between said at least four equiangularly spaced apart radially extending ribs at diametrically opposite sides of said bushing, the tubular inner portion, the tubular outer portion and the ribs being generally the same thickness relative to each other, to thereby facilitate a change in the angular relationship between ribs when subject to an impact force and cause a non-linear spring rate to develop in the sway bar bushing.

12. A method of supporting and controlling the motion of a sway bar on an apparatus in response to a force comprising the steps of:
providing an elastomeric bushing having an axially elongated tubular inner portion defining a bore for receiving the sway bar, an axially elongated tubular outer portion coaxially surrounding said tubular inner portion, and at least four equiangularly spaced spokes extending between said tubular inner portion and said tubular outer portion, and wherein the tubular inner portion, the tubular outer portion and the spokes are generally the same thickness relative to thereby facilitate a change in angular relationship between the spokes when subject to an impact force and cause a non-linear spring rate to develop in the sway bar;
fixedly mounting said elastomeric bushing on the sway bar such that a diametric plane bisects angles between said spokes;
changing an angular relationship between said spokes when the sway bar is moved by a force in a direction of the diametric plane; and
causing a non-linear spring rate to develop within said bushing action on the sway bar to control movement of the sway bar.

* * * * *